(12) United States Patent
Etzkorn et al.

(10) Patent No.: US 9,176,332 B1
(45) Date of Patent: Nov. 3, 2015

(54) CONTACT LENS AND METHOD OF MANUFACTURE TO IMPROVE SENSOR SENSITIVITY

(71) Applicant: Google Inc., Mountain View, CA (US)

(72) Inventors: James Etzkorn, Mountain View, CA (US); Jeffrey George Linhardt, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/659,302

(22) Filed: Oct. 24, 2012

(51) Int. Cl.
*G02C 1/00* (2006.01)
*G02C 11/00* (2006.01)
*G02C 7/04* (2006.01)

(52) U.S. Cl.
CPC ........ *G02C 11/10* (2013.01); *G02C 7/04* (2013.01); *G02C 2202/16* (2013.01)

(58) Field of Classification Search
CPC .......... G02C 7/04; G02C 7/049; G02C 11/10; G02C 2202/06; G02C 2202/16
USPC .................. 351/158, 159.02, 159.03, 159.73, 351/159.74
See application file for complete search history.

(56) References Cited

U.S. PATENT DOCUMENTS

| | | | |
|---|---|---|---|
| 3,958,560 A | 5/1976 | March | |
| 4,014,321 A | 3/1977 | March | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,214,014 A | 7/1980 | Hofer et al. | |
| 4,309,085 A | 1/1982 | Morrison | |
| 4,312,575 A | 1/1982 | Peyman et al. | |
| 4,401,371 A | 8/1983 | Neefe | |
| 4,463,149 A | 7/1984 | Ellis | |
| 4,555,372 A | 11/1985 | Kunzler et al. | |

(Continued)

FOREIGN PATENT DOCUMENTS

| EP | 0369942 | 5/1990 |
|---|---|---|
| EP | 0686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.
Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.
Chu et al., "Biomedical soft contact-lens sensor for in situ ocular biomonitoring of tear contents," Biomed Microdevices, 2011, pp. 603-611, vol. 13.

(Continued)

*Primary Examiner* — Huy K Mai
(74) *Attorney, Agent, or Firm* — McDonnell Boehnen Hulbert & Berghoff LLP

(57) ABSTRACT

Contact lenses and methods of manufacture are provided. A contact lens can include: an electronics substrate having components formed thereon and disposed within a contact lens forming (CLF) polymer, wherein a first one of the components is positioned at a first region of the electronics substrate and a second one of the components is positioned at a second region of the electronics substrate, the second region being opposite the first region; and a plurality of CLF polymer layers molded such that the plurality of CLF polymer layers has a first thickness in a region of the electronics substrate associated with the first one of the components and has a second thickness in a region of the electronics substrate associated with the second one of the components.

25 Claims, 14 Drawing Sheets

(56) References Cited

U.S. PATENT DOCUMENTS

| | | |
|---|---|---|
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint et al. |
| 5,177,165 A | 1/1993 | Valint et al. |
| 5,177,168 A | 1/1993 | Baron et al. |
| 5,219,965 A | 6/1993 | Valint et al. |
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicolson et al. |
| 5,908,906 A | 6/1999 | Kunzler et al. |
| 5,981,669 A | 11/1999 | Valint et al. |
| 6,087,941 A | 7/2000 | Ferraz et al. |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder et al. |
| 2012/0109296 A1 | 5/2012 | Fan |
| 2012/0177576 A1 | 7/2012 | Hu |
| 2012/0199995 A1* | 8/2012 | Pugh et al. .................. 264/1.36 |
| 2012/0201755 A1 | 8/2012 | Rozakis et al. |
| 2012/0245444 A1 | 9/2012 | Otis et al. |
| 2012/0259188 A1 | 10/2012 | Besling |

(56) References Cited

U.S. PATENT DOCUMENTS

| | | | |
|---|---|---|---|
| 2014/0085602 A1* | 3/2014 | Ho et al. | 351/159.03 |
| 2014/0206966 A1* | 7/2014 | Liu et al. | 600/345 |

FOREIGN PATENT DOCUMENTS

| | | |
|---|---|---|
| EP | 1061874 | 12/2000 |
| EP | 1818008 | 8/2007 |
| EP | 1947501 | 7/2008 |
| EP | 1617757 | 8/2009 |
| EP | 2457122 | 5/2012 |
| WO | 95/04609 | 2/1995 |
| WO | 01/16641 | 3/2001 |
| WO | 01/34312 | 5/2001 |
| WO | 03/065876 | 8/2003 |
| WO | 2004/060431 | 7/2004 |
| WO | 2004/064629 | 8/2004 |
| WO | 2006/015315 | 2/2006 |
| WO | 2009/094643 | 7/2009 |
| WO | 2010/105728 | 9/2010 |
| WO | 2010/133317 | 11/2010 |
| WO | 2011/011344 | 1/2011 |
| WO | 2011/034592 | 3/2011 |
| WO | 2011/035228 | 3/2011 |
| WO | 2011/035262 | 3/2011 |
| WO | 2011/083105 | 7/2011 |
| WO | 2011/163080 | 12/2011 |
| WO | 2012/035429 | 3/2012 |
| WO | 2012/037455 | 3/2012 |
| WO | 2012/051167 | 4/2012 |
| WO | 2012/051223 | 4/2012 |
| WO | 2012052765 | 4/2012 |

OTHER PUBLICATIONS

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-µW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 µA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Bionic contact lens 'to project emails before eyes,' http://www.kurzweilai.netforums/topic/bionic-contact-lens-to-project-emails-before-eyes, Last accessed Mar. 14, 2012, 2 pages.

Brahim, et al., "Polypyrrole-hydrogel composites for the construction of clinically important biosensors," 2002, Biosensors & Bioelectronics, pp. 53-59, vol. 17.

Chen, et al., "Microfabricated Implantable Parylene-Based Wireless Passive Intraocular Pressure Sensors," Journal of Microelectromechanical Systems, Dec. 2008, pp. 1342-1351, vol. 17, No. 6.

Chu, et al., "Soft Contact-lens Sensor for Monitoring Tear Sugar as Novel Wearable Device of Body Sensor Network," http://www.ksi edu/seke/dms11/DMS/2_Kohji_Mitsubayashi.pdf, Last accessed Jul. 27, 2012, 4 pages.

"Contact Lenses: Look Into My Eyes," The Economist, Jun. 2, 2011 , http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul.-Aug. 2009, pp. 48-53, vol. 8, No. 7.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Huang, et al., "Wrinkling of Ultrathin Polymer Films," Mater. Res. Soc. Symp. Proc., 2006, 6 pages, vol. 924, Materials Research Society.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Liao, et al., "A 3-µW CMOS Glucose Sensor for Wireless Contact-Lens Tear Glucose Monitoring," IEEE Journal of Solid-State Circuits, Jan. 2012, pp. 335-344, vol. 47, No. 1.

Liao, et al., "A 3-µW Wirelessly Powered CMOS Glucose Sensor for an Active Contact Lens," 2011 IEEE International Solid-State Circuits Conference, Session 2, Feb. 21, 2011, 3 pages.

Lingley, et al., "A Single-Pixel Wireless Contact Lens Display," Journal of Micromechanics and Microengineering, 2011, pp. 1-8.

Lingley, et al., "Multipurpose integrated active contact lenses," SPIE, 2009, 2 pages.

Liu, et al., "Miniature Amperometric Self-Powered Continuous Glucose Sensor with Linear Response," Analytical Chemistry, 2012, 7 pages.

Loncar, et al., "Design and Fabrication of Silicon Photonic Crystal Optical Waveguides," Journal of Lightwave Technology, Oct. 2000, pp. 1402-1411, vol. 18, No. 10.

Murdan, "Electro-responsive drug delivery from hydrogels," Journal of Controlled Release, 2003, pp. 1-17, vol. 92.

Pandey, et al., "A Fully Integrated RF-Powered Contact Lens With a Single Element Display," IEEE Transactions on Biomedical Circuits and Systems, Dec. 2010, pp. 454-461, vol. 4, No. 6.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Selner, et al., "Novel Contact Lens Electrode Array for Multi-electrode Electroretinography (meERG)," IEEE, 2011, 2 pages.

(56) References Cited

OTHER PUBLICATIONS

Singh, et al., "Novel Approaches in Formulation and Drug Delivery using Contact Lenses," Journal of Basic and Clinical Pharmacy, May 2011, pp. 87-101, vol. 2, Issue 2.

Thomas, et al., "Functional Contact Lenses for Remote Health Monitoring in Developing Countries," IEEE Global Humanitarian Technology Conference, 2011, pp. 212-217, IEEE Computer Society.

Tweedie, et al., "Contact creep compliance of viscoelastic materials via nanoindentation," J. Mater. Res., Jun. 2006, pp. 1576-1589, vol. 21, No. 2, Materials Research Society.

Wall, K., "Active contact lens that lets you see like the Terminator patented," Feb. 10, 2012, http://vvww.patexia.com/feed/active-contact-lens-that-lets-you-see-like-the-terminator-patented-2407, Last accessed Mar. 28, 2012, 5 pages.

Zarbin, et al., "Nanotechnology in ophthalmology," Can J Ophthalmol, 2010, pp. 457-476, vol. 45, No. 5.

* cited by examiner

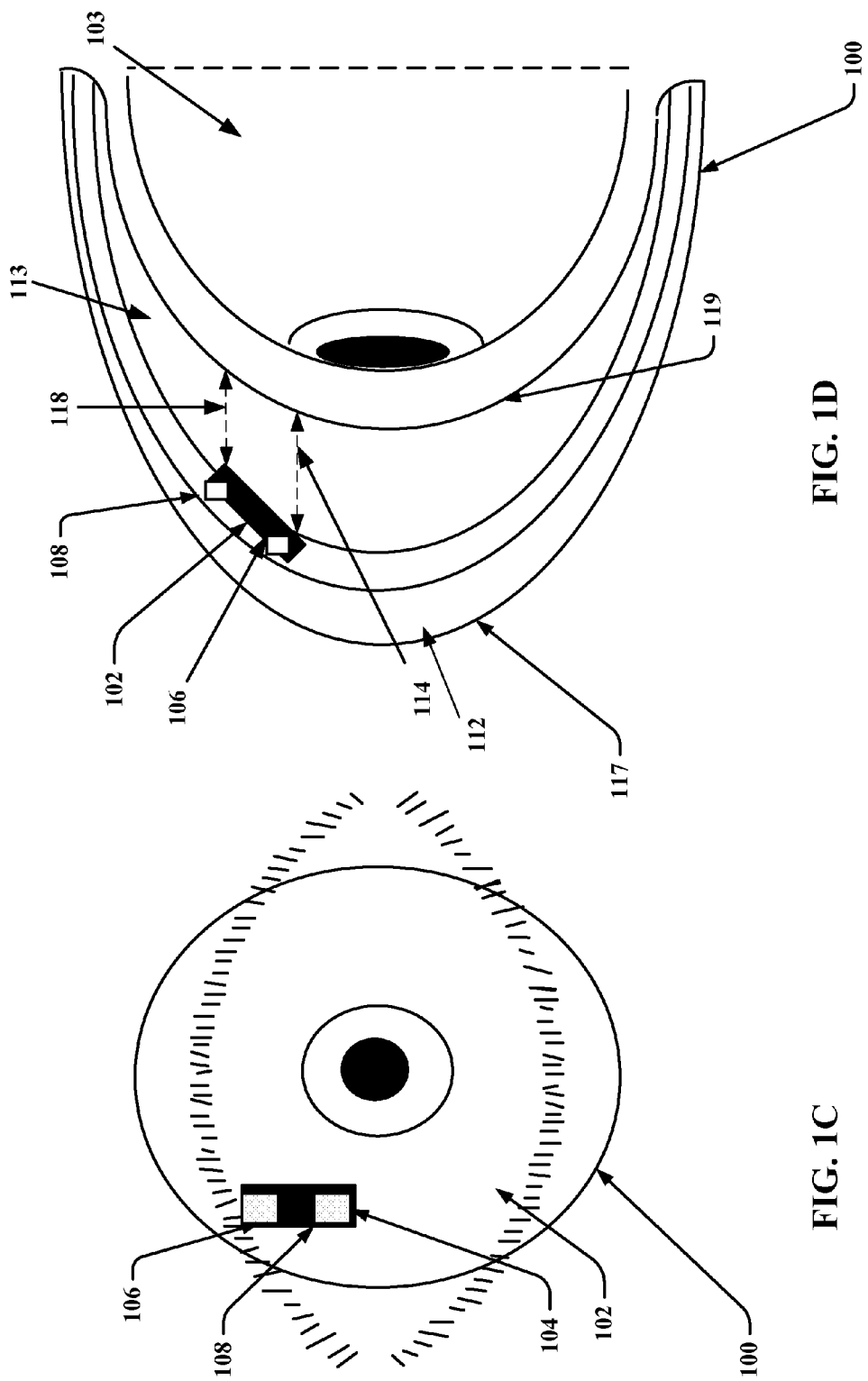

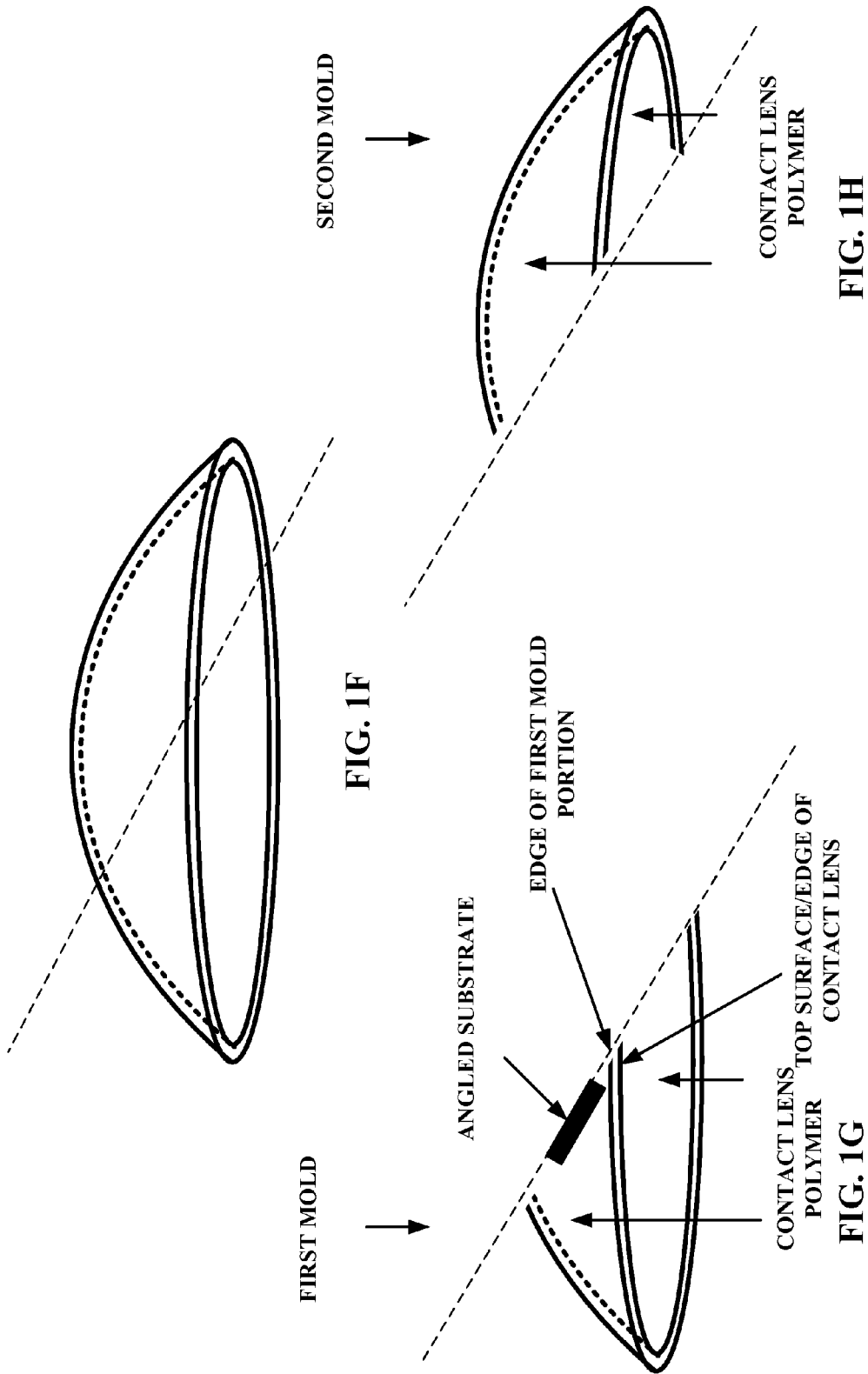

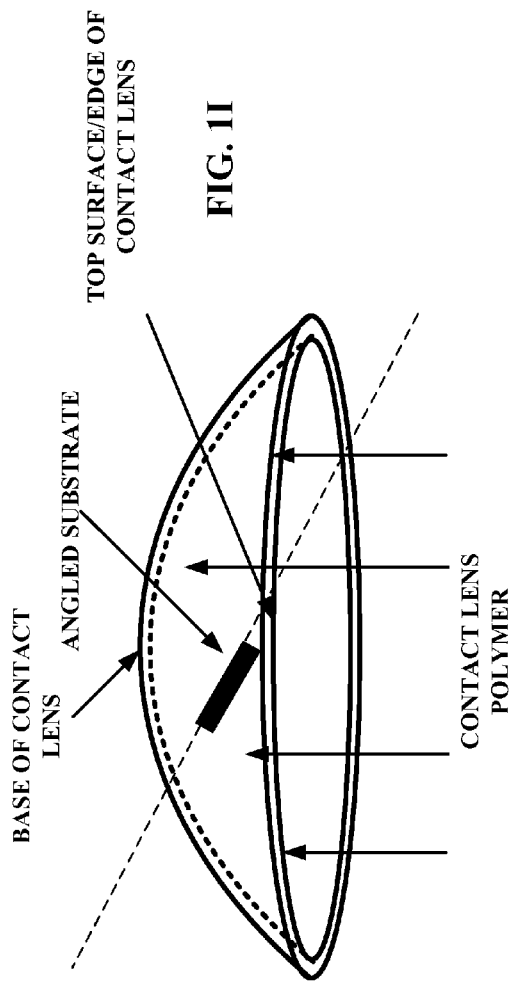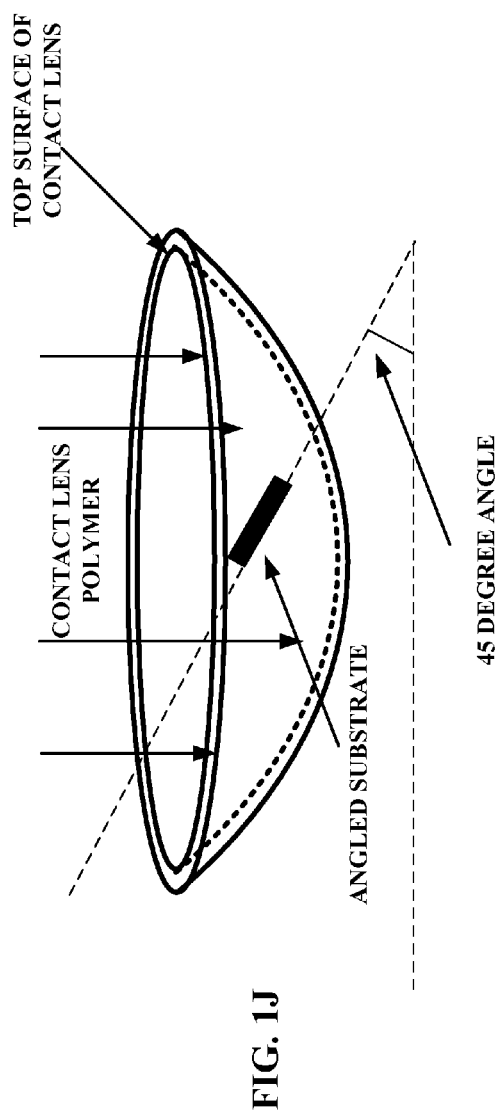

CONTACT LENS AND METHOD OF MANUFACTURE TO IMPROVE SENSOR SENSITIVITY

TECHNICAL FIELD

This disclosure generally relates to a contact lens and method of manufacture to improve sensor sensitivity.

BRIEF DESCRIPTION OF THE DRAWINGS

FIGS. 1C and 1D are illustrations of top and side views of an exemplary non-limiting contact lens in accordance with aspects described herein.

FIGS. 1F, 1G, 1H, 1I and 1J are illustrations of perspective views of exemplary non-limiting molds and corresponding contact lenses in accordance with aspects described herein.

SUMMARY OF THE INVENTION

Figure 1B:
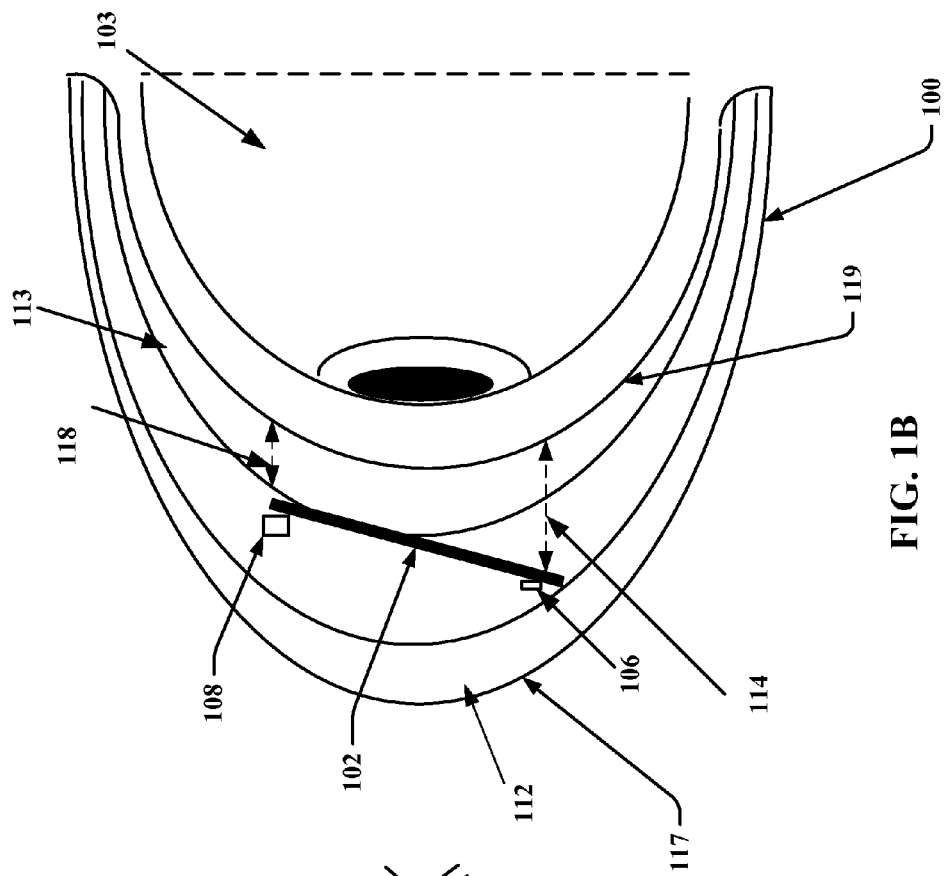
FIGS. 1A and 1B are illustrations of top and side views of an exemplary non-limiting contact lens in accordance with aspects described herein.

Various aspects are now described with reference to the drawings, wherein like reference numerals are used to refer to like elements throughout. In the following description, for purposes of explanation, numerous specific details are set forth in order to provide a more thorough understanding of one or more aspects. It is evident, however, that such aspects can be practiced without these specific details. In other instances, structures and devices are shown in block diagram form in order to facilitate describing one or more aspects.

Contact lenses are generally crescent-shaped having an anterior surface that faces out and comes in contact with the inner eyelid and a posterior surface that rests on the cornea of the contact lens wearer. Modern technology has facilitated processes that enable a sensor, chip and/or other devices (e.g., antenna) to be provided on an electronics substrate embedded in a contact lens. However, the location at which a sensor or chip is encapsulated within a contact lens can dictate the amount of contact lens forming (CLF) polymer covering the sensor or chip. As such, sensitivity and/or reaction time for an embedded sensor, for example, can differ depending on location and/or angle of the embedded electronics substrate on which the sensor is provided. In some aspects, the electronics substrate can be molded and aligned with the base of the contact lens and, as a result of the height of the chip on the electronics substrate, the CLF polymer over the sensor can be excessive. Rather than taking such an approach to design, the electronics substrate can be designed to be positioned near an edge of the contact lens, and angled such that a region of the electronics substrate on which the sensor is fabricated is proximate to the edge of the contact lens, thereby reducing thickness of CLF polymer over the sensor.

Ability to perform accurate and efficient sensing is an important function of an active contact lens. Analyte, proximity, pressure and/or temperature sensing are examples of types of sensing that can be performed.

With sensors, communication from the contact lens is an important aspect of functionality. To facilitate communication, chips (e.g., integrated circuits) can be included in the contact lens. Chips are electronic circuits typically fabricated by lithography or the patterned diffusion of trace elements into an electronics substrate of semiconductor material. Additional materials can be deposited and patterned to form interconnections (e.g., metal lines) between devices.

The relative cost and performance of chips makes these devices advantageous over discrete circuits. For example, the cost for chips can be low because chip components can be printed as a single unit by photolithography. Photolithography is a micro-fabrication process used to selectively remove parts of a thin film or bulk of an electronics substrate by employing light to transfer a pattern from a photo mask to a light-sensitive chemical photo resist on the thin film or electronics substrate. A series of chemical treatments then can engrave the exposure pattern into the material underneath the photo resist (or enable deposition of a new material in the desired pattern on the material).

Also, the lower relative cost of chips renders the devices advantageous over discrete circuits because less material is employed in constructing packaging for the chip. Finally, the small size of the chip and close proximity of components can result in high performance because the components can switch quickly and consume minimal amounts of power.

While it is advantageous to include chips in contact lenses, because the chip has a height that is typically greater than height of the sensor, amount of CLF polymer above the sensor is generally dictated by height of the chip. Unfortunately, excess CLF polymer above the sensor can reduce sensitivity of the sensor and/or sensing time, depending on type of the sensor. To facilitate numerous different types of sensors for contact lenses, the electronics substrate can be angled to reduce amount of CLF polymer above the sensor.

Molding (e.g., injection molding) can be employed to angle and position the electronics substrate such that the sensor is near an edge of the contact lens. In injection molding, a material (e.g., plastic, rubber) can be heated and injected into a mold. The material hardens in the shape of the mold when the material cools and, in many cases, when pressure is applied to the cooling material.

Most polymers, sometimes referred to as resins, including thermoplastics, are well-suited for injection molding. Molds can be formed from a variety of suitable materials including, but not limited to, steel, aluminum or silicone.

Injection molding machines, also known as presses, hold the molds in which components (e.g., electronics substrates) are shaped. Presses are rated by tonnage, which is the amount of clamping force that the injection molding machine can exert.

The molding process involves high pressure injection of the material into a mold that shapes the material into the desired shape. For example, pelletized raw material can be fed through a hopper into a heated barrel. The pellets can be heated to a liquid form, and then cooled (while pressure is applied) to cause the liquid to harden into the shape of the mold.

The clamping force of the press can keep the mold closed during the injection process. The amount of clamping force needed to keep the mold closed can vary depending on projected area of the component being molded. As the area increases, the clamping force needed to keep the mold closed increases. Specifically, the projected area is multiplied by a clamp force of from 2 to 8 tons for each square inch of the projected area. Further, if a material to be molded is fairly rigid, the clamping force must be further increased.

In some aspects, cast molding can be employed in the manufacture of contact lenses. Cast molding incorporates a process of depositing liquid material into a two-part mold and curing the material until the material hardens. Specifically, the material is a contact lens forming polymer (CLF polymer) in some aspects. The two parts of the mold are shaped such that, when pressed together, a desired lens shape, diameter, curvature and edge are formed from the liquid material. The material is then cured into solid form through the application of heat and/or ultraviolet (UV) light. In some aspects, with UV curing, the material is a monomer or oligomer mixed with a photoinitiator that causes the monomer or oligomer to harden when exposed to UV light.

In some aspects, spin casting can be employed in the manufacture of contact lenses. Spin casting is a method of employing centrifugal force to create castings from a revolving mold having a hollow cavity in the desired contact lens shape. Generally, the mold is composed of vulcanized silicone or rubber. The disc-shaped mold is spun along the central axis of the mold at a particular speed, and the casting (e.g., liquefied plastic) is poured into the mold through a small opening at the top of the mold. The mold is spun until the plastic solidifies.

In aspects described herein, a contact lens includes a planar electronics substrate having a sensor, chip and/or antenna fabricated on the electronics substrate. The electronics substrate is positioned and angled within the CLF polymer that encapsulates the electronics substrate such that the portion of the electronics substrate on which the sensor is fabricated is a predetermined distance from the edge (e.g., top surface) of the contact lens. In some aspects, a two-part mold can be formed from a three-dimensional crescent shape corresponding to the shape of the contact lens. For example, the first mold can have a cavity in the shape of an upper portion of the contact lens and a second mold can have a cavity in the shape of a lower portion of the contact lens. The first mold can be filled with CLF polymer and the electronics substrate having the sensor, chip and antenna can be applied against a surface of the upper portion (or embedded within the upper portion). CLF polymer can also be applied in the second mold portion. Pressure and cooling can be applied to the two portions of the mold to fit the two portions together into the crescent-shape of the contact lens while having the electronics substrate embedded at a predetermined distance from the edge of the contact lens.

The aspects described herein provide contact lenses that include sensors and other components embedded in the contact lens while advantageously maintaining sensitivity and selectivity of the sensor.

Various aspects are as follows. In one aspect, a contact lens is provided. The contact lens can include: an electronics substrate having a first component and a second component formed on or within the electronics substrate, wherein the first component is positioned at a first location of the electronics substrate and the second component is positioned at a second location of the electronics substrate, wherein the first location is different from the second location. The contact lens can also include: a CLF polymer encapsulating at least a portion of the electronics substrate, wherein the CLF polymer is molded such that the CLF polymer has a first thickness in a region of the electronics substrate associated with the first component and has a second thickness in a region of the electronics substrate associated with the second component, wherein the first thickness is different from the second thickness.

In one aspect, another contact lens is provided. The contact lens can include: an electronics substrate having at least two components formed on or within the electronics substrate, wherein a first one of the at least two components is positioned at a first region of the electronics substrate and a second one of the at least two components is positioned at a second region of the electronics substrate, the second region being opposite the first region. The contact lens can also include: a plurality of CLF polymer layers molded such that the plurality of CLF polymer layers has a first thickness in a region of the electronics substrate associated with the first one of the at least two components and has a second thickness, different from the first thickness, in a region of the electronics substrate associated with the second one of the at least two components, wherein the electronics substrate is disposed within the plurality of CLF polymer layers.

In one aspect, a method of manufacturing a contact lens is provided. The method can include: providing a first mold of a plurality of molds, wherein the plurality of molds compose a shape corresponding to a contact lens cavity and wherein the first mold is composed of a shape corresponding to a first portion of the contact lens cavity; providing a second mold of the plurality of molds, wherein the second mold is composed of a shape corresponding to a second portion of the contact lens cavity, the first portion of the contact lens cavity being complementary to the second portion of the contact lens cavity; molding a first (IF polymer and an electronics substrate in the first portion to create a first mold, wherein the electronics substrate is positioned at a predetermined distance from an edge of the first mold; molding a second CLF polymer in the second portion to create a second mold; and molding the first mold and the second mold together to create a contact lens such that the electronics substrate is embedded within the contact lens.

In one aspect, a method of manufacturing a contact lens is provided. The method can include: forming an electronics substrate within the contact lens, wherein the electronics substrate is formed at an angle relative to a base of the contact lens; providing at least two components on or within the electronics substrate; and encapsulating the contact lens in a CLF polymer layer, wherein a portion of the CLF polymer layer is formed at the angle of the electronics substrate, wherein a first region of a portion of the CLF polymer layer corresponds to a position of a first one of the at least two components, and wherein a second region of the portion of the CLF polymer layer corresponds to a position of a second one of the at least two components.

DETAILED DESCRIPTION

Figure 1A:
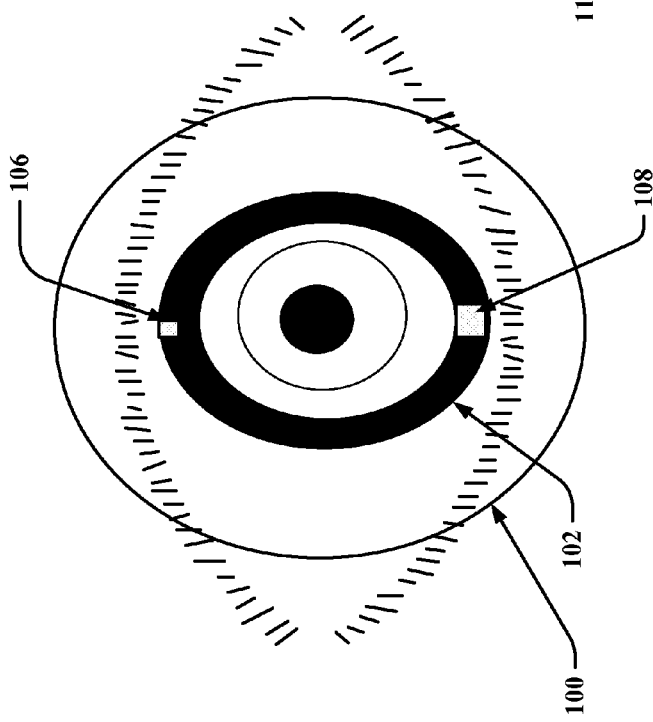
Figure 1E:
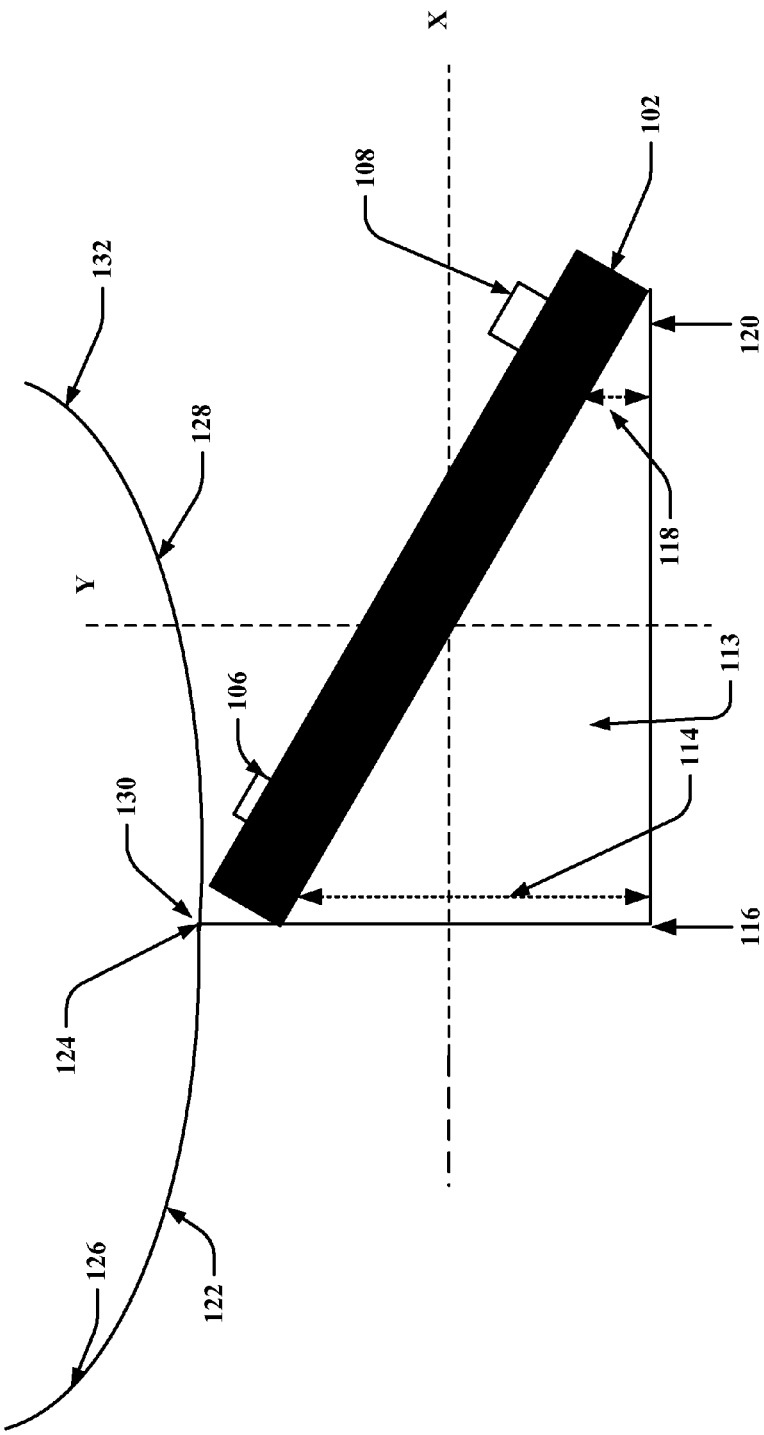
FIG. 1E is an illustration of a partial side view of an exemplary non-limiting contact lens with embedded electronics substrate in accordance with aspects described herein.

Turning first to FIGS. 1A, 1B, 1C, 1D and 1E, contact lens 100 can include an electronics substrate 102. In various aspects, as shown in FIG. 1E, the electronics substrate 102 can be angled relative to a base of the contact lens such that a first region of the electronics substrate 102 near position 116 is closer to a top surface 117 of the contact lens 100 and the second region of the electronics substrate 102 near position 120 is closer to the base 119 of the contact lens. In various aspects, with reference to FIGS. 1A, 1B, 1C, 1D, 1E, 1F, 1G, 1H, 1I and/or 1J, the electronics substrate 102 can be referred to interchangeably as slanted, angled or positioned at an incline.

As shown in FIGS. 1A and 1B, the electronics substrate 102 can be substantially ring-shaped. For example, the electronics substrate 102 can have an inner diameter that is approximately 8 millimeters and/or an outer diameter that is within the range of about 10-14 millimeters. It is to be appreciated that any suitable range for the inner and outer diameters of the ring can be employed. For example, the inner ring diameter can fall within a range of 7-9 millimeters.

The electronics substrate 102 can include a sensor 106 and a second component (e.g., chip 108). The sensor 106 can be positioned at an area of the electronics substrate 102 that is opposite from the position at which the second component is provided. For example, as shown in FIGS. 1B, 1D and 1E, sensor 106 can be positioned at a first region of the electronics substrate 102 near position 116 and chip 108 can be positioned at a second region of the electronics substrate 102 near position 120. In various aspects, the sensor 106 can be any number of different types of sensors, including, but not limited to, temperature sensor, potential hydrogen (pH) sensor, glucose sensor, cholesterol sensor, lactate sensor, urea sensor or the like.

In some aspects, the second component can be a chip 108. The chip 108 can be an integrated circuit manufactured through the lithography process or by patterning semiconductor devices, and interconnections between the devices, into an electronics substrate of material. In some aspects, the chip 108 can be fabricated on the electronics substrate 102 by fabricating metal pads (not shown) on the electronics substrate 102. The chip 108 is then attached to a metal pad.

In various aspects, the chip 108 can be a system-on-a-chip (SoC) in which the components for a computer are included in chip 108 and/or a three-dimensional integrated circuit (3D-IC) having two or more layers of electronic components integrated vertically and/or horizontally into chip 108. In various aspects, the chip 108 can be configured to transmit information from and/or receive information at the contact lens 100.

In some aspects, the contact lens 100 can also include an antenna (not shown). The antenna can be ring-shaped and can be provided on the surface of the electronics substrate 102. For example, with reference to FIGS. 1A, 1B, 1C and 1D, the antenna can be ring-shaped and be provided along the ring-shaped substrate 102. As an example, in some aspects, the antenna can be provided along the periphery of the electronics substrate 102. The antenna can be a radio frequency (RF) antenna configured to receive RF signals from a RF device (e.g., an RF reader) and communicate RF signals from the contact lens 100.

As shown in FIGS. 1B and 1D, a plurality of CLF polymer layers 112 can be provided to form the outer surface of the contact lens 100. For example, in some aspects, a first collective CLF polymer layer 113 can be slanted and provided below the electronics substrate 102, sensor 106, chip 108 and antenna 110. For example, the electronics substrate 102, sensor 106, chip 108 and antenna 110 can be formed on the first collective CLF polymer layer 113.

The first collective CLF polymer layer 113 can be formed at an angle resulting in different amounts of thickness below the sensor 106 relative to the thickness below the chip 108. For example, the thickness 114 at position 116 of the first collective CLF polymer layer 113 is greater than the thickness 118 at position 120 of the first collective CLF polymer layer 113. As shown, the first collective CLF polymer layer 113 can complement and/or offset the slant of the electronics substrate 102.

With reference to FIGS. 1B, 1D and 1E, the plurality of CLF polymer layers 112 can also include a first curved layer 122 having a first side 124 joined near position 116 of the first collective CLF polymer layer 113 and a second side 126 that forms the edge of the contact lens 100. The plurality of CLF polymer layers 112 can also include a second curved layer 128 having a first side 130 joined near position 116 of the CLF polymer layer such that the first curved layer 122 and/or the second curved layer 128 cover the sensor 106 and form a side (e.g., top edge) of the contact lens. The second curved layer 128 can also have a second side 132 that forms another edge of the contact lens.

Because of the slant to the electronics substrate 102, the thickness at position 116 of the first collective CLF polymer layer 113 below the sensor 106 is much greater than the thickness at position 120 of the first collective CLF polymer layer 113. For example, the thickness at position 116 of the first collective CLF polymer layer below the sensor 106 is approximately 100-300 microns while the thickness at position 120 of the first collective CLF polymer layer is approximately 5-50 microns.

Referring back to FIGS. 1B and 1D, the collective CLF polymer layer 112 can be formed such that the layer extends around and above the electronics substrate 102. As such, the collective CLF polymer layer 112 can encapsulate the electronics substrate 102, sensor 106 and any components disposed on or within the electronics substrate 102 (e.g., chip 108 and antenna 110).

The collective CLF polymer layer 112 can be further formed to have a shape suitable for application of the contact lens 100 to the eye 103 of a wearer of the contact lens 100.

In various aspects, the collective CLF polymer layer 112 can be composed of hydrogel, silicone hydrogel, silicone elastomer and/or rigid gas permeable (RGP) materials. In various aspects, a monomer mixture can be polymerized to form the hydrogel, silicone hydrogel, silicone elastomer and/or RGP materials.

CLF polymer layers described herein (e.g., CLF polymer layer 112) can include a wide variety of polymeric materials, either rigid or soft. Hydrogels comprise hydrated, crosslinked polymeric systems containing water in an equilibrium state. Such hydrogels could be silicone hydrogels, which generally have water content greater than about five weight percent and more commonly between about ten to about eighty weight percent. Such materials are usually prepared by polymerizing a mixture containing at least one siloxane-containing monomer and at least one hydrophilic monomer.

In various aspects, applicable silicone-containing monomeric units that can be employed can include, but are not limited to, poly(organosiloxane)monomeric units; bulky polysiloxanylalkyl(meth)acrylic monomers (e.g., methacryloxypropyl tris(trimethylsiloxy)silane); and silicone containing monomers. In various aspects, silicone containing monomers can include, but are not limited to, silicone-containing vinyl carbonate or vinyl carbamate monomers such as 1,3-bis[4-vinyloxycarbonyloxy)but-1-yl]tetramethyldisiloxane; 3-(trimethylsilyl)propyl vinyl carbonate; 3-(vinyloxycarbonylthio)propyl[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

Suitable hydrophilic monomers for use in silicone hydrogels can include, but are not limited to, unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N- dimethylacrylamide, hydrophilic vinyl carbonate or vinyl carbamate monomers, and hydrophilic oxazolone monomers.

RGP materials typically include a hydrophobic cross-linked polymer system containing less than five weight percent water. The use of siloxane-containing monomers having certain fluorinated side groups (e.g., —($CF_2$)—H) have been found to improve compatibility between the hydrophilic and siloxane-containing monomeric units.

Contact lenses made from silicone materials can also be non-hydrogels. Silicone elastomer contact lenses are formed of a silicone elastomer (e.g., polydimethylsiloxane materials). In contrast to silicone hydrogel copolymers, silicone elastomers can be more rubbery and hydrophobic, generally lack a hydrophilic co-monomer, and/or may not absorb appreciable amounts of water.

Silicone contact lenses can tend to have relatively hydrophobic, non-wettable surfaces. Thus, the surface of silicone contact lenses can be rendered more hydrophilic to improve biocompatibility or wettability by tear fluid in the eye.

Examples of commercial silicone hydrogel contact lenses include, but are not limited to, balafilcon A contact lenses (which include plasma-oxidized silicate surfaces) and lotrafilcon A contact lenses (which include plasma-deposited hydrocarbon coating surfaces).

FIGS. 2, 3, 4, 5A, 5B, 6 and 7 are illustrations of exemplary flow charts of methods of manufacturing a contact lens in accordance with aspects described herein. One or more of FIGS. 2, 3, 4, 5A, 5B, 6 and/or 7 will be discussed with reference to FIGS. 1F, 1G, 1H, 1I and/or 1J.

Figure 2:
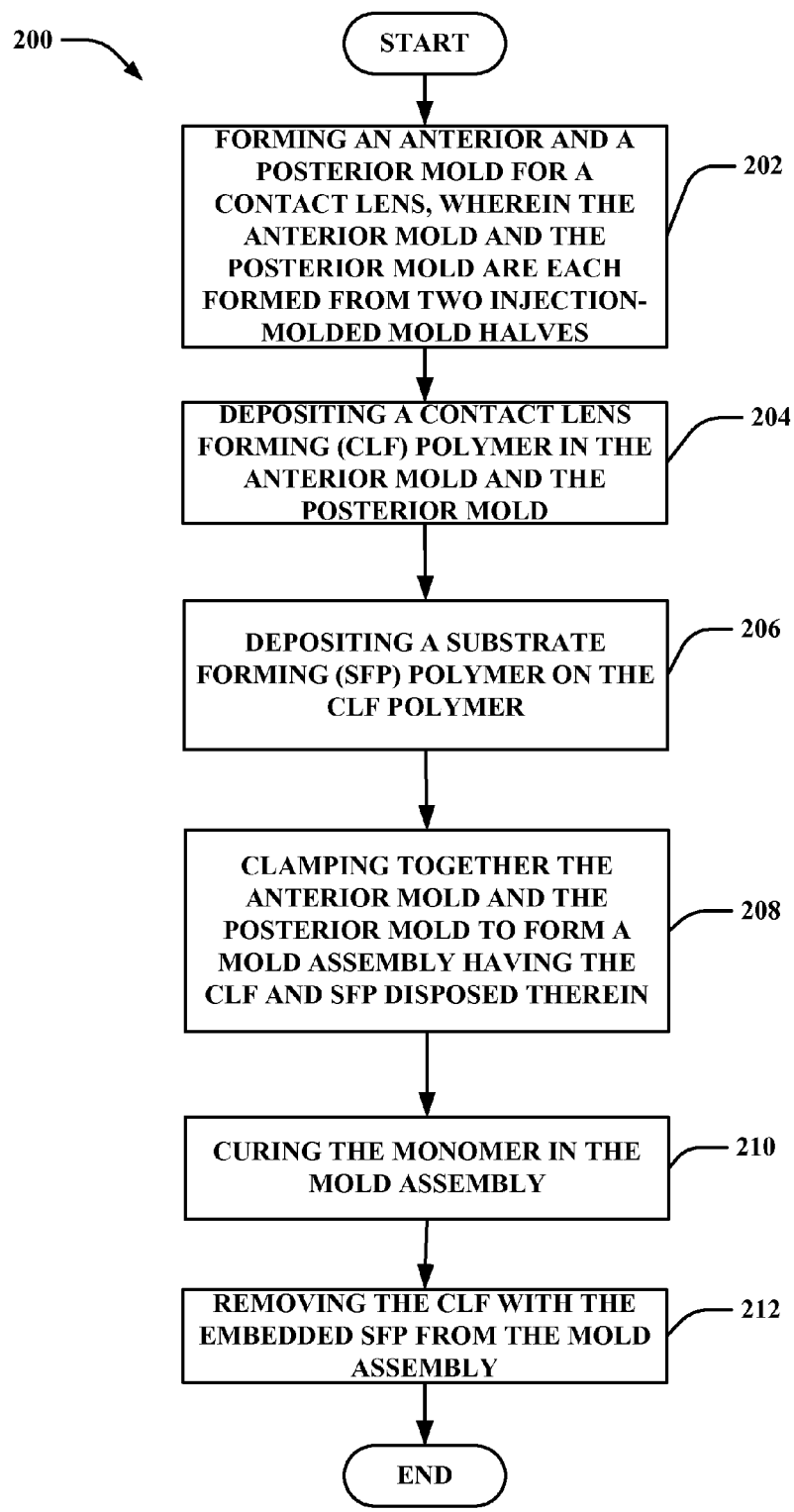
FIGS. 2, 3, 4, 5A, 5B, 6 and 7 are illustrations of exemplary flow charts of methods of manufacturing a contact lens in accordance with aspects described herein.

A cast molding process for manufacturing the contact lens is described with reference to FIG. 2. FIGS. 1G, 1H and 1J are illustrations of perspective views of exemplary non-limiting molds in accordance with aspects described herein. Method 200 will be described with reference to FIGS. 1G, 1H and 1J.

At 202, method 200 can include forming an anterior and a posterior mold for a contact lens, wherein the anterior mold and the posterior mold are each formed from two injection-molded mold halves. In various aspects, the injection molded mold halves can be formed from a number of different materials including, but not limited to, steel or aluminum.

For example, in various aspects, the anterior mold can be formed from two molds that are injection molded. The anterior mold can be formed such as that shown in FIG. 1G in some aspects. Similarly, the posterior mold can be formed from two molds that are injection molded. The posterior mold can be formed such as that shown in FIG. 1H in some aspects. In various aspects, the anterior mold and the posterior mold are formed of rigid polymers.

The anterior mold and the posterior mold can be shaped such that, when pressed together, a desired lens shape, diameter, curvature and edge are formed from the CLF polymer. Additionally, in various aspects, the anterior and posterior molds can be shaped such that when the substrate forming polymer (SFP) is deposited on the CLF, at least a portion of the SFP is closer to the surface of the CLF after curing and hardening the CLF and SFP.

At 204, method 200 can include depositing a CLF polymer in the anterior mold and the posterior mold. In some aspects, the CLF polymer can be a monomer or oligomer mixture that can be polymerized to form a hydrogel, a silicone hydrogel and/or a silicone elastomer. In various aspects, the monomer or oligomer mixture can be or include any of the number of different types of monomer or oligomer mixtures described herein with reference to FIG. 1.

At 206, method 200 can include depositing an SFP on the CLF polymer. In some aspects, the SFP can be in liquid form and include, but is not limited to, parylene, or PET, or another polymer suitable for forming the electronics substrate.

At 208, method 200 can include clamping together the anterior mold and the posterior mold to form a mold assembly having the CLF and SFP disposed therein. At 210, method 200 can include curing the monomer in the mold assembly. In various aspects, curing can be performed via application of ultraviolet (UV) light, thermal curing or the like.

At 212, method 200 can include removing the CLF with the embedded SFP from the mold assembly. A contact lens such as that shown at FIG. 1J can result.

Another cast molding method for manufacturing a contact lens is described with reference to FIG. 3. FIGS. 1G and 1J are illustrations of perspective views of exemplary non-limiting molds in accordance with aspects described herein. Method 300 will be described with reference to FIGS. 1G and 1J.

Figure 3:
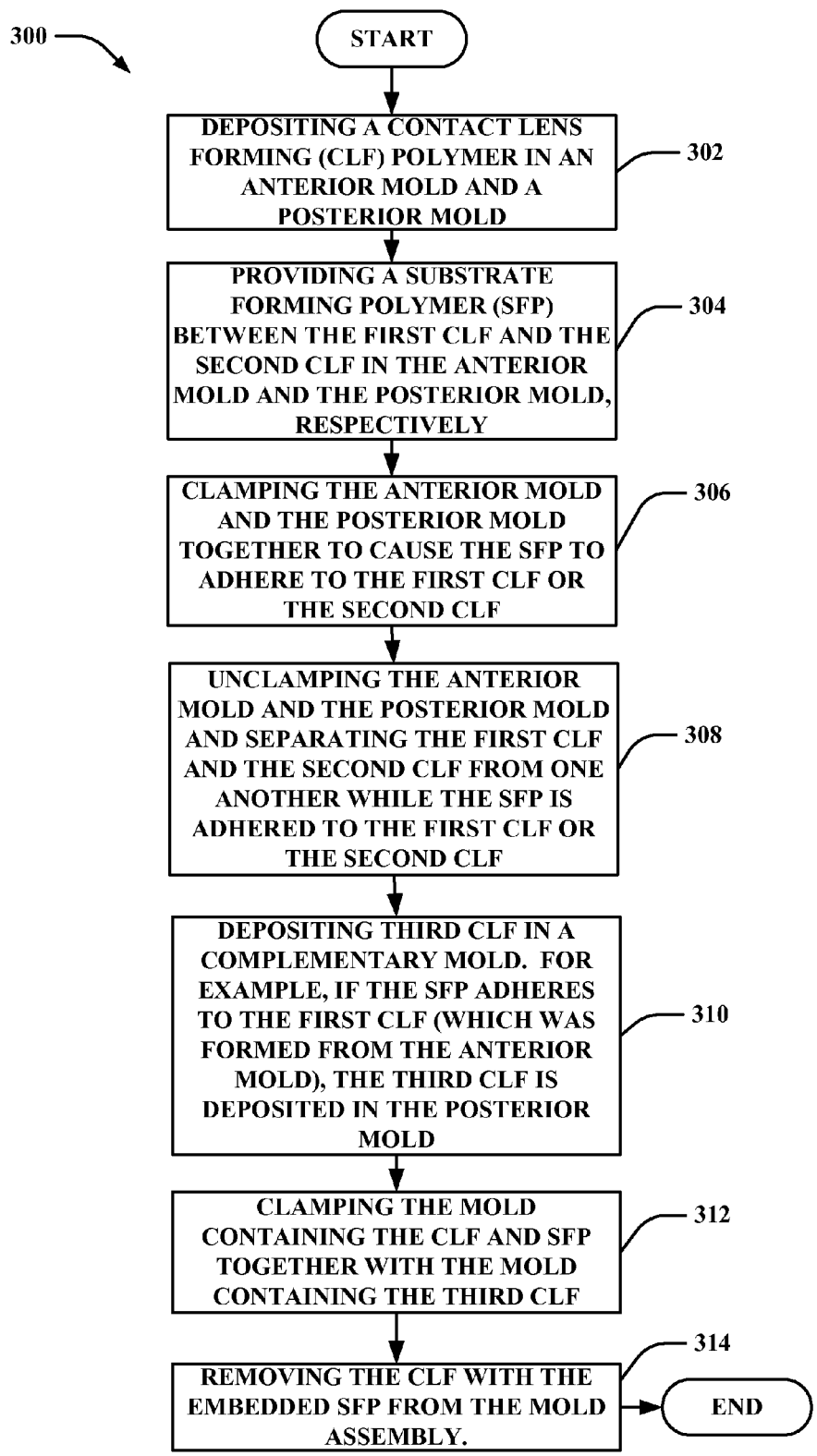

Turning now to FIG. 3, at 302, method 300 can include depositing a CLF in an anterior mold and a posterior mold. At 304, method 300 can include providing an SFP between the first CLF and the second CLF in the anterior mold and the posterior mold, respectively. At 306, method 300 can include clamping the anterior mold and the posterior mold together to cause the SFP to adhere to the first CLF or the second CLF.

At 308, method 300 can include unclamping the anterior mold and the posterior mold and separating the first CLF and the second CLF from one another while the SFP is adhered to the first CLF or the second CLF. For example, FIG. 1G depicts the first CLF and the SFP or the second CLF and the SFP after the first CLF and the second CLF are separated from one another.

At 310, method 300 can include depositing third CLF in a complementary mold. For example, if the SFP adheres to the first CLF (which was formed from the anterior mold), the third CLF is deposited in the posterior mold. As another example, if the SFP adheres to the second CLF (which was formed from the posterior mold), the third CLF is deposited in the anterior mold.

At 312, method 300 can include clamping the mold containing the CLF and SFP together with the mold containing the third CLF. For example, when the molds are clamped together, the CLF and SFP can form a geometry such as that shown in FIG. H.

At 314, method 300 can include removing the CLF with the embedded SFP from the mold assembly. For example, the CLF with the embedded SFP can be as shown in FIG. 1J.

Figure 4:
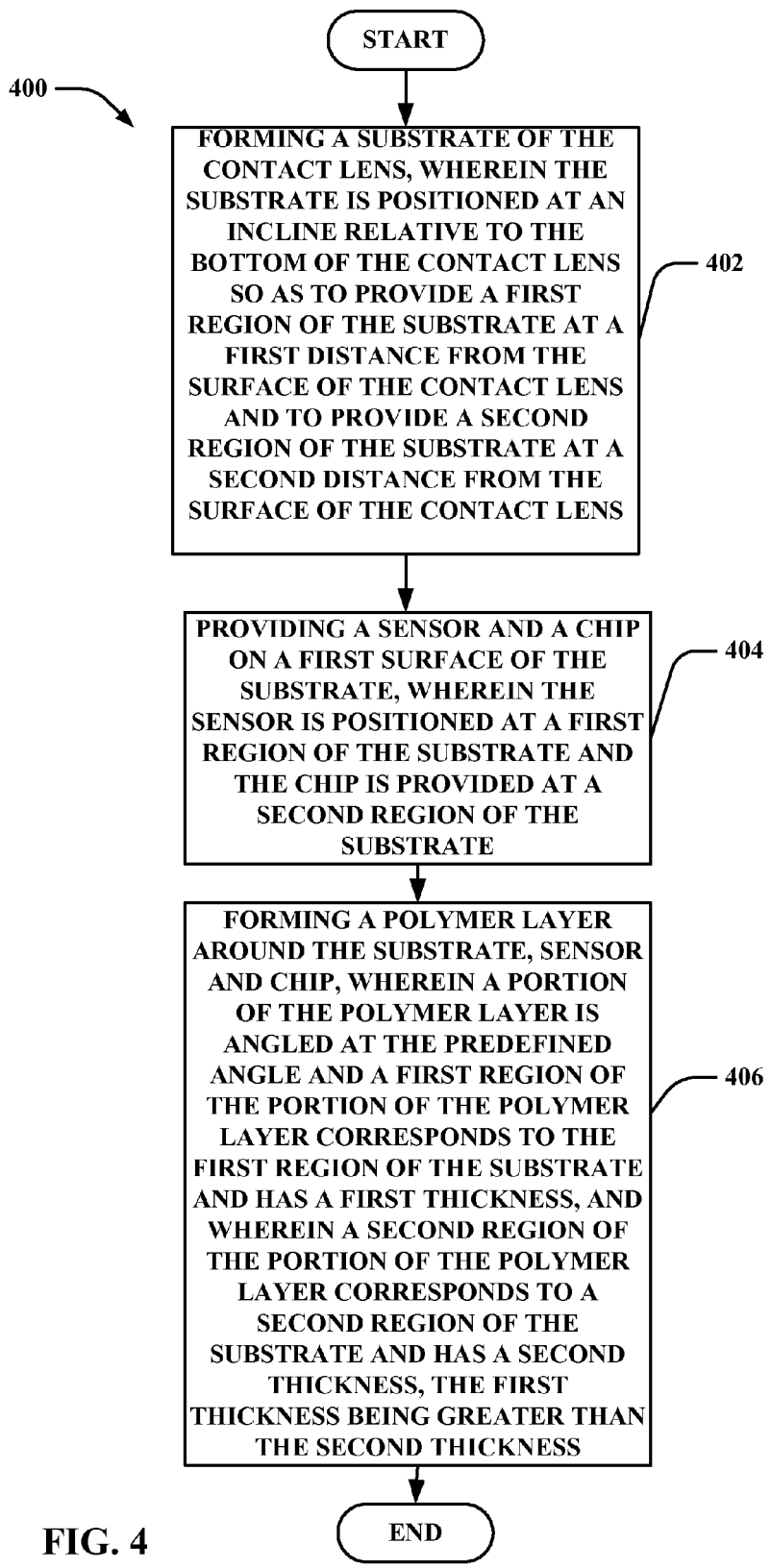
Figure 5A:
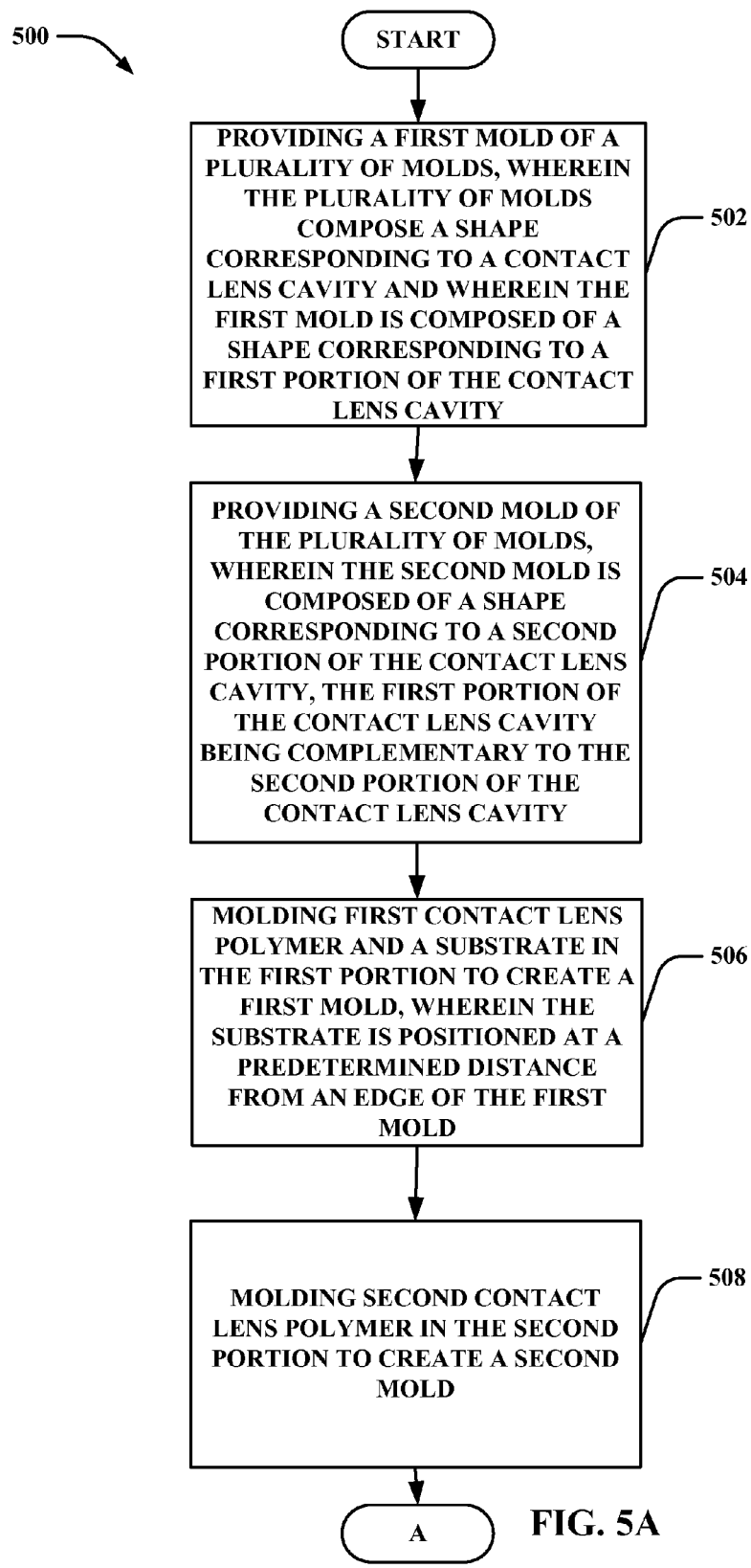
Figure 5B:
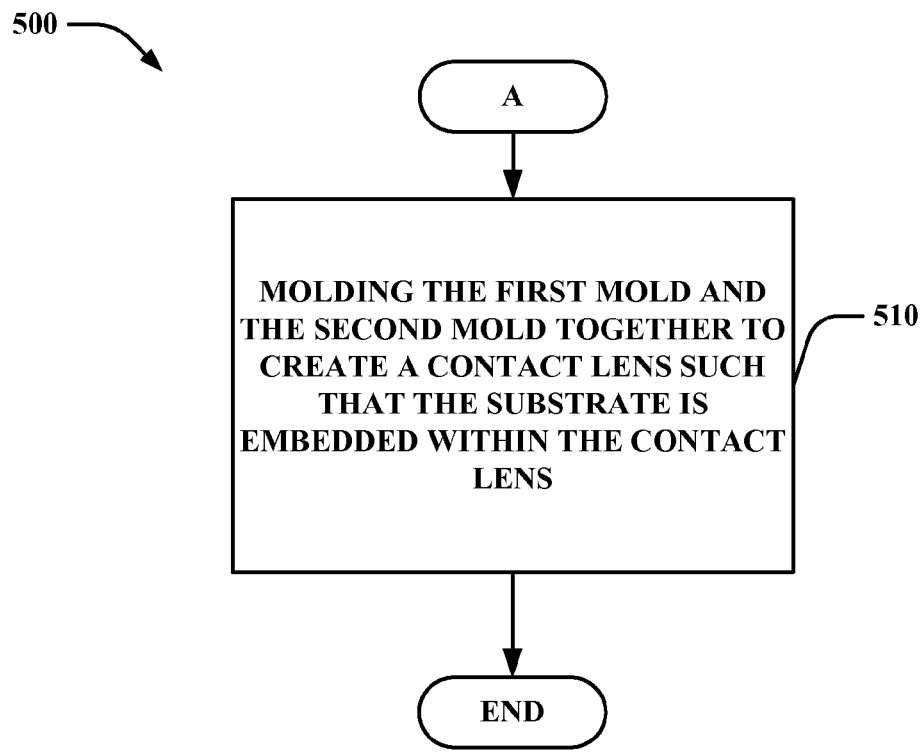

Turning now to FIG. 4, at 402, method 400 can include forming an electronics substrate embedded in the contact lens. The substrate can be formed by molding, die cutting, laser cutting and/or etching processes. In various aspects, the substrate can be formed at an angle relative to the base of the contact lens so as to provide a first portion of the electronics substrate at a first distance from the surface of the contact lens and to provide a second portion of the electronics substrate at a second distance from the surface of the contact lens. In some aspects, the electronics substrate can be formed in a ring shape.

At 404, method 400 can include providing a sensor and a chip on a first surface of the electronics substrate, wherein the sensor is positioned at a first region of the electronics substrate and the chip is provided at a second region of the electronics substrate. For example, a sensor having a first height and a chip having a second height can be positioned on or within the electronics substrate. The chip can have a height that is greater than that of the sensor in some aspects. As such, the sensor can be positioned at the portion of the electronics substrate closer to the surface of the contact lens. Accordingly, the amount of CLF polymer over the sensor can be less than the CLF polymer over the chip. The likelihood of maintaining the sensitivity of the sensor can be therefore increased (relative to aspects wherein the sensor is placed further away from the surface of the contact lens or wherein the electronics substrate is not angled relative to the base of the contact lens).

At 406, method 400 can include forming a CLF polymer layer around the electronics substrate, sensor and chip, wherein a portion of the CLF polymer layer is angled at the predetermined angle that complements or offsets the angle of the electronics substrate. A first region of the portion of the CLF polymer layer corresponds to the first region of the electronics substrate and has a first thickness, and a second region of the portion of the CLF polymer layer corresponds to a second region of the electronics substrate and has a second thickness, the first thickness being greater than the second thickness. In this aspect, the portion of the CLF polymer layer under the chip can have a thickness of approximately 5-50 microns while the portion of the CLF polymer layer under the sensor can have a thickness of approximately 100-300 microns.

FIG. 5 is an illustration of an exemplary flow chart of a method of manufacturing a contact lens in accordance with aspects described herein. FIGS. 1F, 1G, 1H, 1I and 1J are illustrations of perspective views of exemplary non-limiting molds in accordance with aspects described herein. Method 500 will be described with reference to FIGS. 1F, 1G, 1H, 1I and 1J.

FIG. 1F illustrates a complete contact lens mold having the first mold portion and the second mold portion joined to one another. In various aspects, the contact lens mold can be formed of silicone, steel, aluminum, polypropylene or polystyrene. Turning now to FIG. 5, at 502, method 500 can include providing a first mold of a plurality of molds, wherein the molds compose a shape corresponding to a contact lens cavity and wherein the first mold is composed of a shape corresponding to a first portion of the contact lens cavity. The first mold and the second mold, when joined to one another, result in a complete contact lens shape such as that shown in FIG. 1F.

The dashed line indicates points at which the contact lens mold can be separated into two molds to form the first mold and the second mold. For example, in some aspects, the contact lens mold can be divided along a 45 degree line through the entirety of the contact lens mold as shown in FIG. 1F.

Precision machining can be employed to divide the contact lens mold into a first mold and a second mold. The first mold is shown at FIG. 1G and the second mold is shown at FIG. 1H. A two-part molding process can be employed to form the CLF polymer having the embedded electronics substrate.

At 504, method 500 can include providing a second mold of the plurality of molds, wherein the second mold is composed of a shape corresponding to a second portion of the contact lens cavity, the first portion of the contact lens cavity being complementary to the second portion of the contact lens cavity.

At 506, method 500 can include molding first CLF polymer and an electronics substrate in the first mold to create a first molded portion, wherein the electronics substrate is positioned at a predetermined distance from an edge of the first mold.

As shown in FIG. 1G, the CLF polymer can be heated and provided in the first mold. The electronics substrate can also be provided in the first mold. Specifically, in some aspects, the electronics substrate can be embedded in the CLF polymer at a position corresponding to a predetermined distance from the edge of the contact lens mold as shown in FIG. 1G. As shown, the molding can be performed with the flat portion of the mold facing down onto the molding surface. The electronics substrate can be a flat planar surface molded in a position 1-3 millimeters from the edge of the first mold in various aspects.

In some aspects, molding the electronics substrate also includes angling the electronics substrate such that a first region of the electronics substrate is proximate to the edge of the first mold. For example, the electronics substrate can be angled at a 45 degree angle relative to the base of the contact lens.

The CLF polymer can be provided in the first mold via injection molding. The CLF polymer can then be cooled inside of the first mold and pressure can be concurrently applied to form the first molded portion of the contact lens.

Although not shown, the electronics substrate can include a sensor, chip and/or antenna fabricated on the electronics substrate. In various aspects, the electronics substrate can include a sensor fabricated proximate to the first region of the electronics substrate (in which the first region of the electronics substrate is closer to the edge of the contact lens mold than the second region of the electronics substrate). As such, the sensor can have a minimal amount of CLF polymer over the sensor thereby reducing the amount of interference with sensitivity and/or response time typically caused by the CLF polymer.

In various aspects, the electronics substrate can also include a chip fabricated proximate to a second region of the electronics substrate such that the chip can have a greater amount of CLF polymer over the chip than the amount of CLF polymer over the sensor. By placing the chip on the second region of the electronics substrate (which is opposite the first region) the chip can be provided closer to the base of the contact lens. An antenna can be positioned on the surface of the electronics substrate.

At 508, method 500 can include molding second CLF polymer in the second portion to create a second molded portion. The CLF polymer can be heated and provided in the second mold via injection molding. As shown in FIG. 1H, the CLF polymer can then be cooled inside of the second mold and pressure can be concurrently applied to form the second molded portion of the contact lens. In various aspects, molding can be performed with the flat portion of the mold facing down onto the molding surface.

At 510, method 500 can include molding the first molded portion and the second molded portion together to create a contact lens such that the electronics substrate is embedded within the contact lens as shown in FIG. H. FIG. 1J is a rotated view of the molded contact lens. The view shown at FIG. 1J corresponds to the orientation of the view shown at FIG. 1E.

Figure 6:
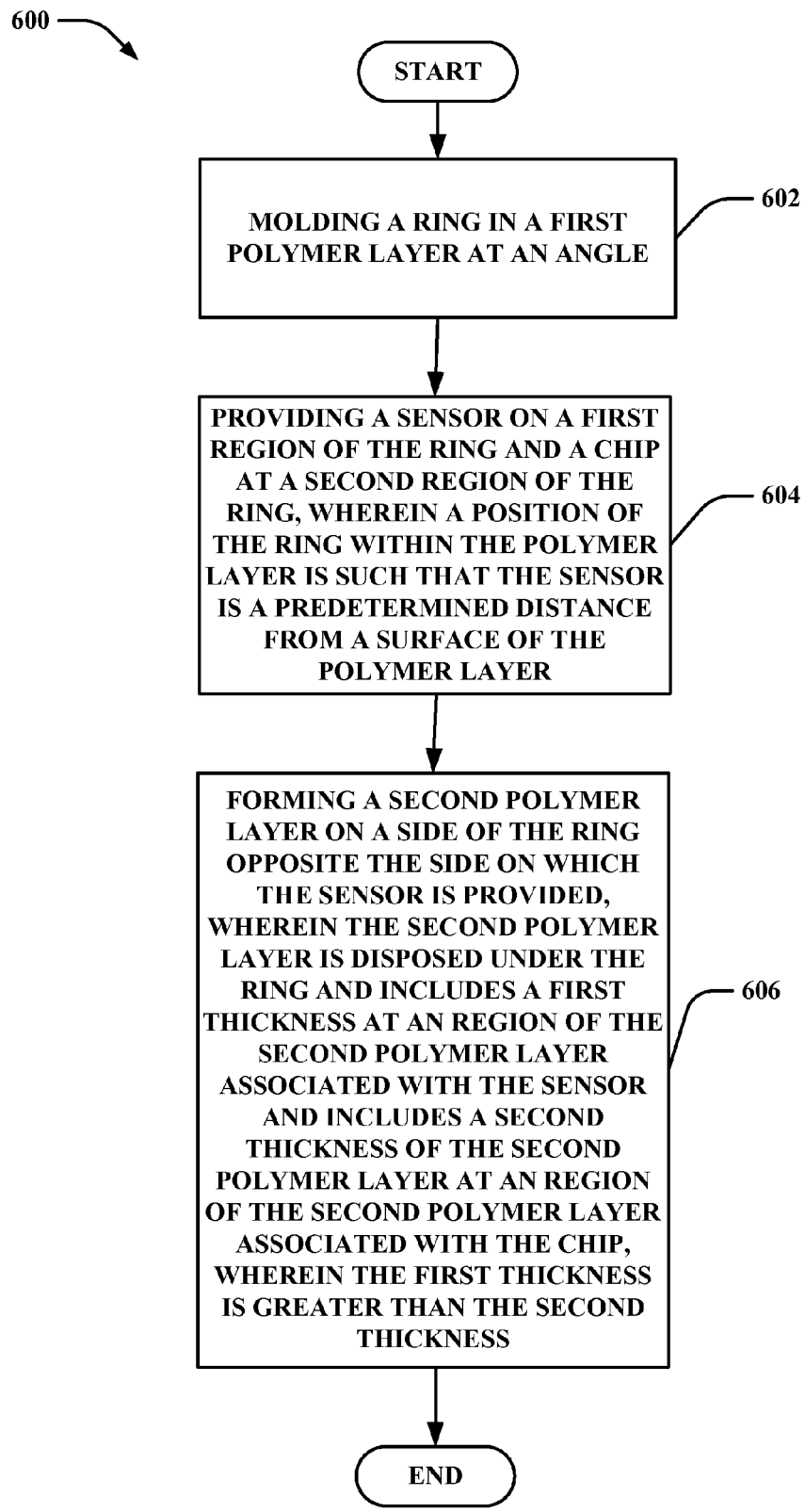

Turning now to FIG. 6, at 602, method 600 can include molding a ring in a first CLF polymer layer at an angle. The angle can be any number of different angles less than 90 degrees (e.g., 45 degrees, 70 degrees). The angle can be measured relative to a plane provided along the direction of the base of the contact lens as shown in FIG. 1J.

At 604, method 600 can include providing a sensor in a first region of the ring and a chip in a second region of the ring, wherein a position of the ring within the CLF polymer layer is such that the sensor is a predetermined distance from a surface of the CLF polymer layer. In these aspects, the sensor can be provided at the top region of the angled ring such that the sensor is a distance from the top of the CLF polymer layer that is suitable for maintaining sensing sensitivity and response time.

At 606, method 600 can include forming a second CLF polymer layer on a side of the ring opposite the side on which the sensor is provided, wherein the second CLF polymer layer is disposed under the ring and includes a first thickness at a region of the second CLF polymer layer associated with the sensor and includes a second thickness of the second CLF polymer layer at a region of the second CLF polymer layer associated with the chip, wherein the first thickness is greater than the second thickness. Accordingly, the second CLF polymer layer is a layer below the ring, and provides CLF polymer from under the ring to the bottom of the contact lens. As such, the second CLF polymer layer can provide support for the ring as the ring can be disposed on the second CLF polymer layer.

Figure 7:
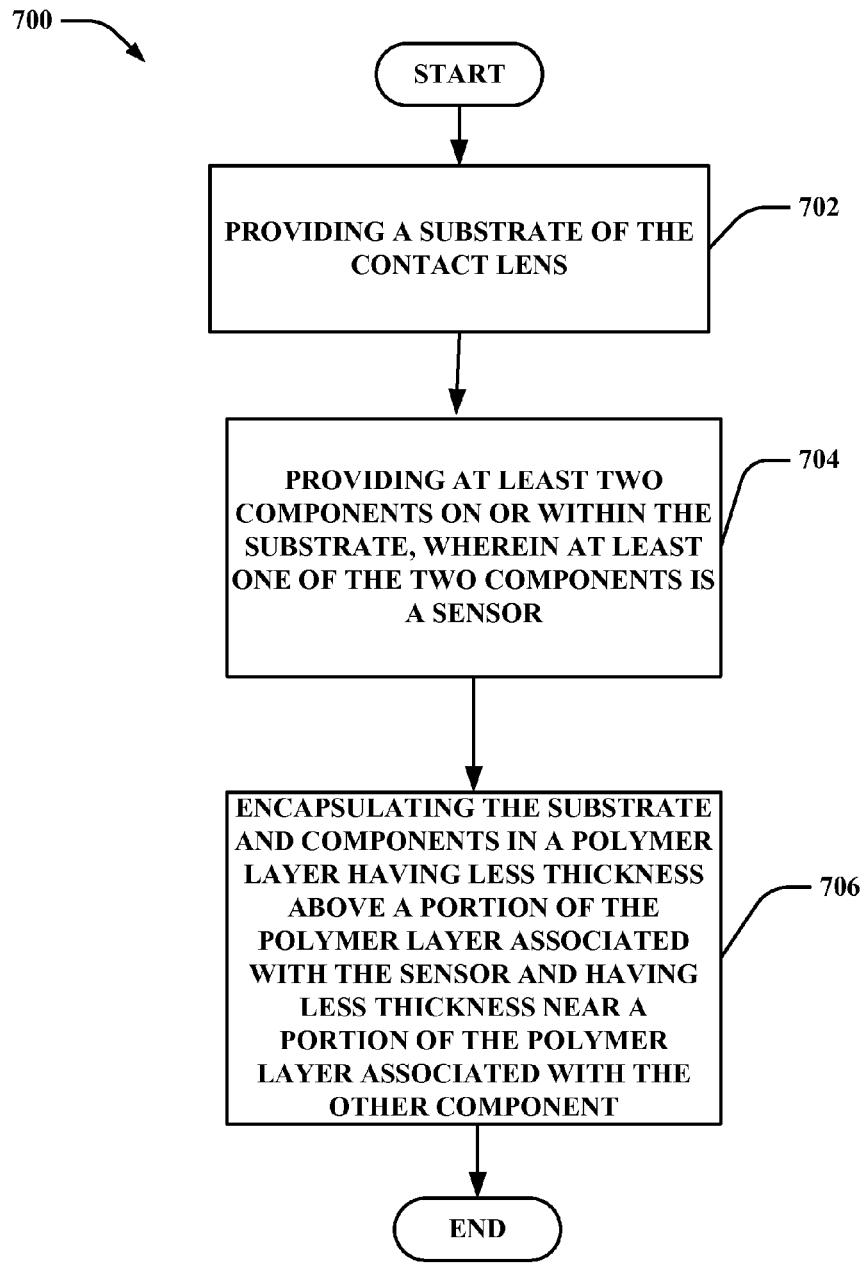

Turning now to FIG. 7, at 702, method 700 can include providing an electronics substrate embedded in a contact lens. At 704, method 700 can include providing at least two components on or within the electronics substrate, wherein at least one of the two components is a sensor. At 706, method 700 can include encapsulating the electronics substrate components in a CLF polymer layer having less thickness above a portion of the CLF polymer layer associated with the sensor and having less thickness near a portion of the CLF polymer layer associated with the other component.

Exemplary Networked and Distributed Environments

Figure 8:
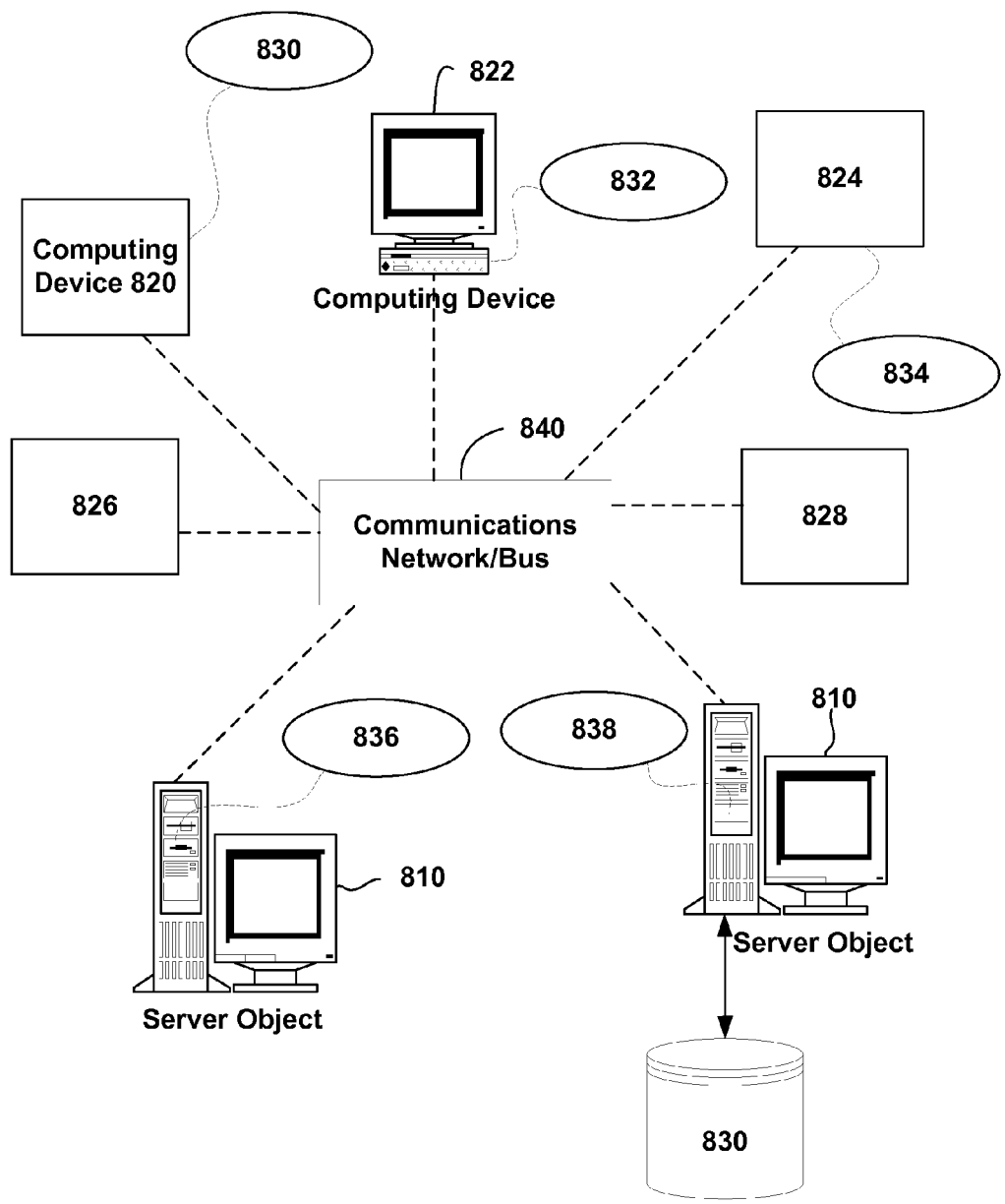
FIG. 8 is an illustration of a schematic diagram of an exemplary networked or distributed computing environment with which one or more aspects described herein can be associated.

FIG. 8 provides a schematic diagram of an exemplary networked or distributed computing environment with which one or more aspects described in this disclosure can be associated. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It can be appreciated that computing objects 810, 812, etc. and computing objects or devices 820, 822, 824, 826, 828, etc. can include different devices, such as active contact lenses (and components thereof), personal digital assistants (PDAs), audio/video devices, mobile phones, MPEG-1 Audio Layer 3 (MP3) players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 can include other computing objects and computing devices that provide services to the system of FIG. 8, and/or can represent multiple interconnected networks, which are not shown.

In a network environment in which the communications network/bus 840 can be the Internet, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP).

Exemplary Computing Device

As mentioned, advantageously, the techniques described in this disclosure can be associated with any suitable device. In various aspects, the data store can include or be included within, any of the memory described herein and/or any of the contact lenses described herein. In various aspects, the data store can be any repository for storing information transmitted to or received from the contact lens.

Figure 9:
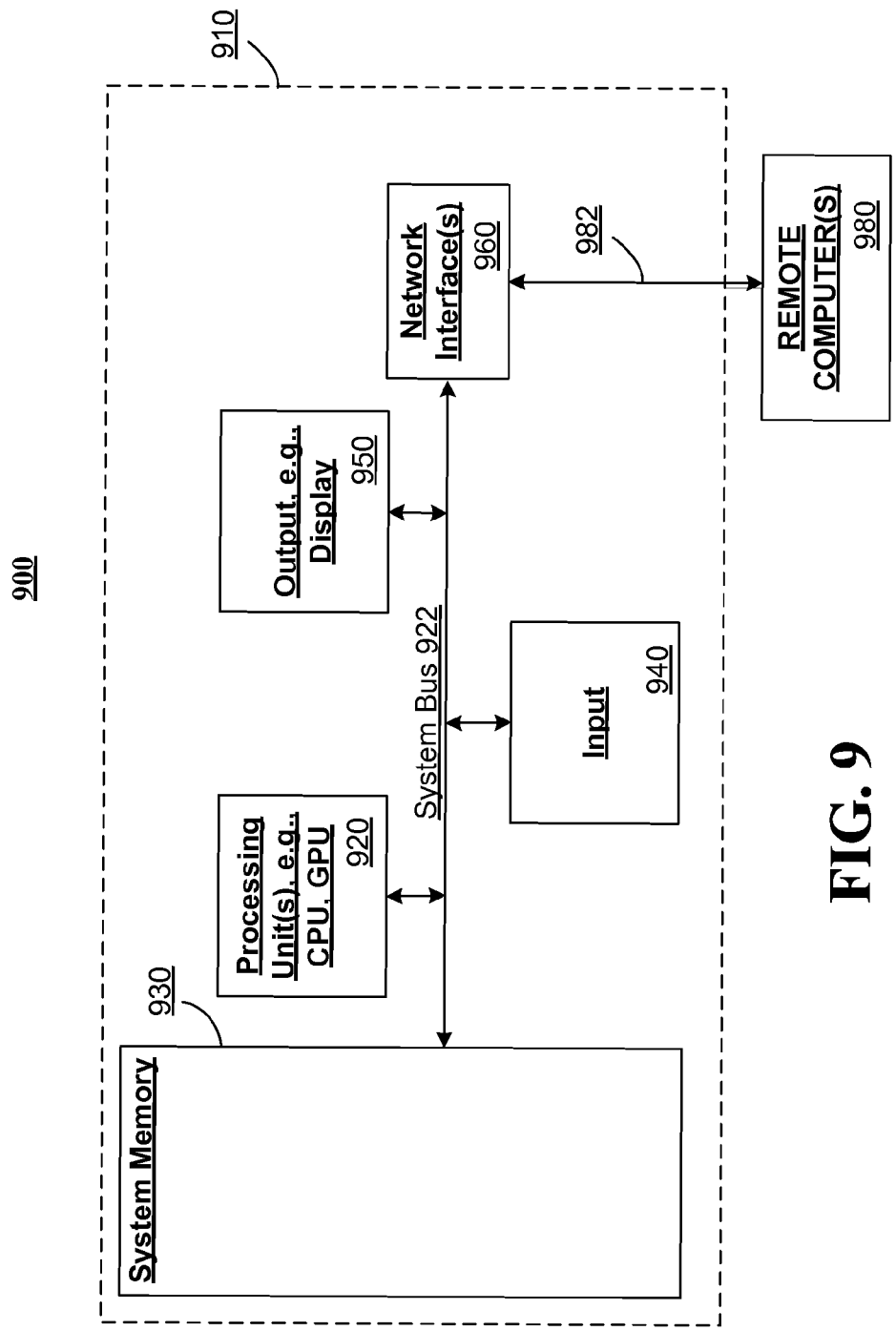
FIG. 9 is an illustration of a schematic diagram of an exemplary computing environment with which one or more aspects described herein can be associated.

FIG. 9 illustrates an example of a suitable computing system environment 900 in which one or aspects of the aspects described in this disclosure can be implemented. Components of computer 910 can include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program components, and program data.

A user can enter commands and information into the computer 910 through input devices 940 (e.g., keyboard, keypad, a pointing device, a mouse, stylus, touchpad, touch screen, motion detector, camera, microphone or any other device that allows the user to interact with the computer 910). A monitor or other type of display device can be also connected to the system bus 922 via an interface, such as output interface 950. In addition to a monitor, computers can also include other peripheral output devices such as speakers and a printer, which can be connected through output interface 950.

The computer 910 can operate in a networked or distributed environment using logical connections to one or more other remote computers, such as remote computer 980. The remote computer 980 can be a personal computer, a server, a router, a network PC, a peer device or other common network node, or any other remote media consumption or transmission device, and can include any or all of the elements described above relative to the computer 910. The logical connections depicted in FIG. 9 include a network 982, such local area network (LAN) or a wide area network (WAN), but can also include other networks/buses e.g., cellular networks.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program components, structured data, or unstructured data. Computer-readable storage media can include, but are not limited to, RAM, ROM, electrically erasable programmable read only memory (EEPROM), flash memory or other memory technology, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium. In various aspects, the computer-readable storage media can be, or be included within, the memory, contact lens (or components thereof) or reader described herein.

On the other hand, communications media typically embody computer-readable instructions, data structures, program components or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals.

It is to be understood that the aspects described in this disclosure can be implemented in hardware, software, firmware, middleware, microcode, or any combination thereof. For a hardware aspect, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

For a software aspect, the techniques described in this disclosure can be implemented with components or components (e.g., procedures, functions, and so on) that perform the functions described in this disclosure. The software codes can be stored in memory units and executed by processors.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The aforementioned systems have been described with respect to interaction between several components. It can be appreciated that such systems and components can include those components or specified sub-components. Sub-components can also be implemented as components communicatively coupled to other components rather than included within parent components (hierarchical). Additionally, it is to be noted that one or more components can be combined into a single component providing aggregate functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flow charts and/or flow diagrams of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described in this disclosure after.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be provided across a plurality of devices. The invention is not to be limited to any single aspect, but rather can be construed in breadth, spirit and scope in accordance with the appended claims.

What is claimed is:

1. A contact lens, comprising:
an electronics substrate having a first component and a second component formed on or within the electronics substrate, wherein the first component is positioned at a first location of the electronics substrate and the second component is positioned at a second location of the electronics substrate, wherein the first location is different from the second location; and
a contact lens forming polymer (CLF polymer) encapsulating at least a portion of the electronics substrate, wherein the CLF polymer is molded such that the CLF polymer has a first thickness in a region of the electronics substrate associated with the first component and has a second thickness in a region of the electronics substrate associated with the second component, wherein the first thickness is different from the second thickness, such that the region of the electronics substrate associated with the first component is positioned closer to a surface of the contact lens than the region of the electronics substrate associated with the second component.

2. The contact lens of claim 1, wherein the electronics substrate is substantially ring-shaped.

3. The contact lens of claim 1, wherein at least one of the first component or the second component is an integrated circuit.

4. The contact lens of claim 1, wherein the electronic substrate is substantially rectangular in shape.

5. The contact lens of claim 1, wherein the substrate is planar.

6. A contact lens, comprising:
an electronics substrate having at least two components formed on or within the electronics substrate, wherein a first one of the at least two components is positioned at a first region of the electronics substrate and a second one of the at least two components is positioned at a second region of the electronics substrate, the second region being opposite the first region; and
a plurality of contact lens forming polymer (CLF polymer) layers molded such that the plurality of CLF polymer layers has a first thickness in a region of the electronics substrate associated with the first one of the at least two components and has a second thickness, different from the first thickness, in a region of the electronics substrate associated with the second one of the at least two components, wherein the electronics substrate is disposed within the plurality of CLF polymer layers.

7. The contact lens of claim 6, wherein the first thickness is greater than the second thickness.

8. The contact lens of claim 6, wherein the first thickness is approximately 100-300 microns and the second thickness is approximately 5-50 microns.

9. The contact lens of claim 6, wherein the at least two components comprise a sensor and a chip.

10. The contact lens of claim 9, wherein the first one of the at least two components is the sensor and the second one of the at least two components is the chip.

11. The contact lens of claim 6, wherein the electronics substrate is substantially ring-shaped.

12. The contact lens of claim 11, wherein the electronics substrate has an inner diameter that is approximately 7-9 millimeters and an outer diameter that is approximately 10-14 millimeters.

13. The contact lens of claim 11, further comprising an antenna formed along a periphery of the electronics substrate.

14. A method of manufacturing a contact lens, comprising:
providing a first mold of a plurality of molds, wherein the plurality of molds compose a shape corresponding to a contact lens cavity and wherein the first mold is composed of a shape corresponding to a first portion of the contact lens cavity;
providing a second mold of the plurality of molds, wherein the second mold is composed of a shape corresponding to a second portion of the contact lens cavity, the first portion of the contact lens cavity being complementary to the second portion of the contact lens cavity;
molding a first contact lens forming polymer (CLF polymer) and an electronics substrate in the first portion to create a first mold, wherein the electronics substrate is positioned at a predetermined distance from an edge of the first mold;
molding a second CLF polymer in the second portion to create a second mold; and
molding the first mold and the second mold together to create a contact lens such that the electronics substrate is embedded within the contact lens.

15. The method of claim 14, wherein the molding the electronics substrate further comprises angling the electronics substrate such that a first region of the electronics substrate is proximate to the edge of the first mold.

16. The method of claim 15, wherein the electronics substrate comprises a sensor fabricated proximate to the first region of the electronics substrate.

17. The method of claim 16, wherein the electronics substrate further comprises:
a chip fabricated proximate to a second region of the electronics substrate, the second region being opposite the first region; and
an antenna positioned on a surface of the electronics substrate.

18. A method of manufacturing a contact lens, comprising:
forming an electronics substrate within the contact lens, wherein the electronics substrate is formed at an angle relative to a base of the contact lens;
providing at least two components on or within the electronics substrate; and
encapsulating the contact lens in a contact lens forming polymer (CLF polymer) layer, wherein a portion of the CLF polymer layer is formed at the angle of the electronics substrate, wherein a first region of a portion of the CLF polymer layer corresponds to a position of a first one of the at least two components, and wherein a second region of the portion of the CLF polymer layer corresponds to a position of a second one of the at least two components, wherein the first region of the portion of the CLF polymer layer has a first thickness and the second region of the portion of the CLF polymer layer has a second thickness, and wherein the first thickness is greater than the second thickness, such that the first component is positioned closer to the base of the contact lens than the second component.

19. The method of claim 18, wherein the first thickness is approximately 100-300 microns, and wherein the second thickness is approximately 5-50 microns.

20. The method of claim 18, wherein the first one of the at least two components is a sensor.

21. The method of claim 18, wherein the second one of the at least two components is a chip.

22. The method of claim 18, wherein the forming the electronics substrate comprises forming a substantially ring-shaped electronics substrate.

23. The method of claim 18, further comprising providing an antenna on the electronics substrate.

24. The method of claim 18, wherein the CLF polymer layer comprises at least one of hydrogel, silicone elastomer, silicone hydrogel or a rigid gas permeable material.

25. The method of claim 18, wherein the substrate is planar.

* * * * *